United States Patent
Weterrings et al.

[11] Patent Number: 6,026,685
[45] Date of Patent: *Feb. 22, 2000

[54] ADJUSTABLE MEASURING DEVICE

[75] Inventors: Frans M. Weterrings, Tuscumbia; E. Stanley Robbins, Killen; Rodney W. Robbins; Larry J. Sexton, both of Florence, all of Ala.

[73] Assignee: Robbins Industries Inc., Florence, Ala.

[*] Notice: This patent issued on a continued prosecution application filed under 37 CFR 1.53(d), and is subject to the twenty year patent term provisions of 35 U.S.C. 154(a)(2).

[21] Appl. No.: 08/780,391

[22] Filed: Jan. 8, 1997

Related U.S. Application Data

[63] Continuation-in-part of application No. 29/036,674, Mar. 24, 1995, Pat. No. Des. 369,304, and application No. 29/036,682, Mar. 24, 1995, Pat. No. Des. 368,865, and application No. 08/585,780, Jan. 16, 1996, abandoned.

[51] Int. Cl.⁷ ..................................................... G01F 19/00
[52] U.S. Cl. ................................................. 73/429; 220/8
[58] Field of Search ................................ 73/429; 220/8, 220/211; 277/228, 205

[56] References Cited

U.S. PATENT DOCUMENTS

| | | | |
|---|---|---|---|
| 153,352 | 7/1874 | Leitzell | 73/429 |
| 1,450,674 | 4/1923 | Marston | 220/8 |
| 1,602,937 | 10/1926 | Rieff | 73/429 |
| 2,158,704 | 5/1939 | Ligon | 73/429 |
| 2,256,865 | 9/1941 | Gilbert . | |
| 2,328,995 | 9/1943 | Olds | 73/429 |
| 2,479,007 | 8/1949 | Gruben . | |
| 2,527,348 | 10/1950 | Berkower | 73/429 |
| 2,551,002 | 5/1951 | Jennings | 73/429 |
| 2,625,044 | 1/1953 | Christie | 73/429 |
| 2,839,928 | 6/1958 | Fohrman . | |
| 3,104,883 | 9/1963 | English et al. | 277/205 |
| 3,215,441 | 11/1965 | Horvereid | 277/176 |
| 3,941,393 | 3/1976 | Bainard | 277/153 |
| 4,116,071 | 9/1978 | Sakura | 73/429 |
| 4,335,609 | 6/1982 | Saulsbury | 73/429 |
| 4,417,503 | 11/1983 | Izumi | 277/205 |
| 4,981,041 | 1/1991 | Merkle . | |

FOREIGN PATENT DOCUMENTS

| | | | |
|---|---|---|---|
| 326664 | 9/1919 | Germany | 73/429 |

*Primary Examiner*—Andrew H. Hirshfeld
*Attorney, Agent, or Firm*—Whitman Breed Abbott & Morgan LLC; Gregor N. Neff

[57] ABSTRACT

The adjustable measuring device has a cylindrical base and a slightly larger cylindrical sleeve which slides upwardly and downwardly on the cylindrical base to form a cup of variable volume. Both cylinders are oblate and preferably are elliptical or oval in cross-section. This allows the height of the device to be reduced, without loss of measuring capacity, and without loss of gripability. Also, the oblate shape forms a natural pour spout. A sealing member having a relatively thin, flexible wiper or flange element forms a seal at the junction between the interior surface of the sleeve and the top of the base member and minimizes leakage of liquid from the cup. A lip on each narrow end of the upper edge of the sleeve minimizes dripping and running of excess liquid down the outside of the sleeve after pouring. In one embodiment, detent mechanisms are provided to accurately locate different measurement positions of the sleeve.

11 Claims, 6 Drawing Sheets

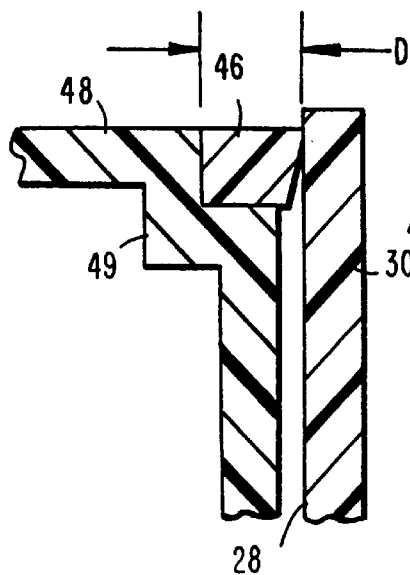
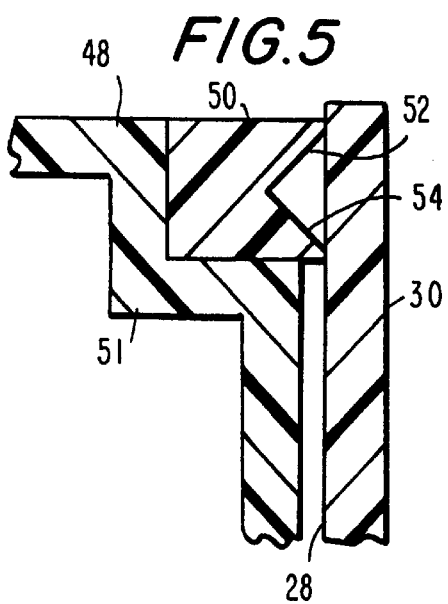
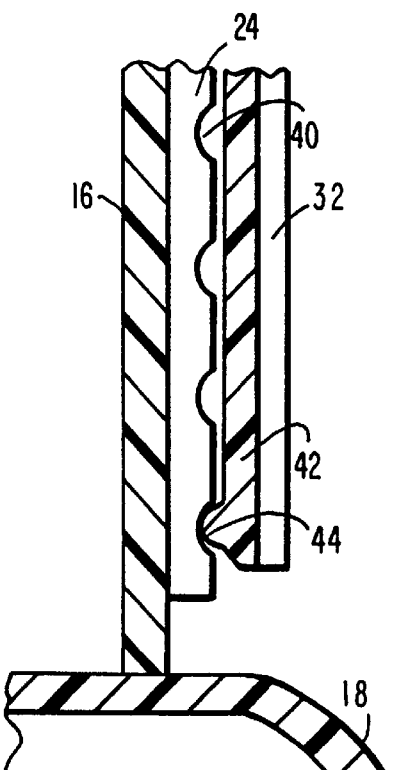

ADJUSTABLE MEASURING DEVICE

This is a continuation-in-part of U.S. patent application Ser. No. 29/036,674, filed Mar. 24, 1995; now U.S. Design Pat. No. 369,304, granted Apr. 30, 1996, Ser. No. 29/036,682, filed Mar. 24, 1995 now U.S. Design Pat. No. 368,865, granted Apr. 16, 1996; and Ser. No. 08/585,780 filed Jan. 16, 1996, now abandoned.

This invention relates to adjustable measurement devices, and particularly to adjustable measuring containers for use in the kitchen in measuring quantities of powdered, granular and liquid food materials.

One type of adjustable measuring device which has long been sold is one which has a cylindrical sleeve which slides upwardly and downwardly over a cylindrical post on a base which rests on a horizontal surface. The post has a sealing member at its top edge. The inside wall of the sleeve and the top of the cylindrical post together form a container of variable volume. The sealing member minimizes leakage. Typically, this device can be used to measure quantities of up to two cups.

One of the problems which such prior devices have is that they tend to be relatively tall when they sit on a counter top, and thus and tend to tip over readily when accidentally struck.

Another problem with such prior devices is that, because of their height, they take up an excessive amount of storage space in kitchen cupboards or drawers.

A third problem with such devices is that when a liquid is poured out of the measuring device, th e stream tends to be relatively wide. This can cause spillage when pouring the liquid from the measuring container into another container. Also, liquids tend to drip and run down the outsides of the device.

Another problem is that the seal between the sleeve and the post tends to leak.

Still further, such prior devices usually lack any means for accurately locating the sleeve relative to the post to facilitate accurate measurements.

Accordingly, it is an object of the invention to provide an adjustable measuring container which eliminates or alleviates the foregoing problems.

Specifically, it is an object of the invention to provide a measuring container of the type described above which is relatively short in height and stable, thus tending not to tip over and occupying relatively little storage space when not in use, without loss of measuring capacity.

It also is an object of the invention to provide such a device with a seal with permits little or no leakage.

It is a further object of the invention to provide such a device which is relatively easy to hold in one's hand and from which liquids can be poured in a relatively narrow stream so as to minimize spillage, and in which the liquid does not tend to run down the sides of the device after pouring.

It is another object of the invention to provide such a device in which the various measurements are marked by not only visible markings, but also by markings such that the proper location of the sleeve relative to the post can be felt.

In accordance with the present invention, the foregoing objects are met by the provision of an adjustable measuring device in which the sleeve is an ablate cylinder, and the sealing edge of the base member has the same ablate shape as the interior of the sleeve. Preferably, the shape of the sleeve and the sealing edge of the base member is elliptical.

The unevident advantages of this construction are several.

One advantage is that the measuring device can be made substantially shorter than the prior art cylindrical device without loss of measurement capacity. As it has been discovered, this result is possible because the effective diameter of the device can be increased without increasing the width of the device which fits in the user's hand. Thus the volume per unit of height is increased without reducing the effectiveness of the grip. That is, the length of the minor axis of the ellipse defining the shape of the sleeve and the sealing member need not be any greater than that of the prior art cylindrical device so that it is as easy, or even easier, to grasp than the prior cylindrical device.

Another advantage of this construction is that the oblate shape of the sleeve creates a pour spout which allows a narrower stream of liquid to be poured from the measuring device, for a given flow rate, thus tending to reduce spillage. A lip on the edge minimizes dripping and running of the liquid down the sides of the device.

A seal is provided in which a relatively thin, elongated flexible wiper or flange contacts the inside of the sleeve. This maintains a good seal despite the relatively wide variations in spacing between the sleeve and the base, thus minimizing leakage of liquid from the container.

The sealing flange extends outwardly and upwardly from the base at a substantial angle. Preferably, it is located in a recess in the upper edge of the base and is dimensioned to extend up no higher than the base so as to permit thick materials such as margarine, etc., to be scraped off the top of the base without damaging the seal.

In accordance with another aspect of the invention, a detent structure is provided in which each of the various measurement positions of the sleeve relative to the base member is marked by a detent which can be felt by the hand of the user. This enhances the accuracy of the device.

The foregoing and other objects and advantages of the invention will be set forth in or apparent from the following description and drawings.

IN THE DRAWINGS

FIG. 4 is a cross-sectional, broken-away view taken along line 4—4 of FIG. 3;

FIG. 5 is a cross-sectional view, like that of FIG. 4, of a portion of an alternative embodiment of the invention;

FIG. 6 is a cross-sectional view taken along line 6—6 of FIG. 3, partially broken-away to show the detent structure of the device of FIGS. 1 through 5;

Figure 1:
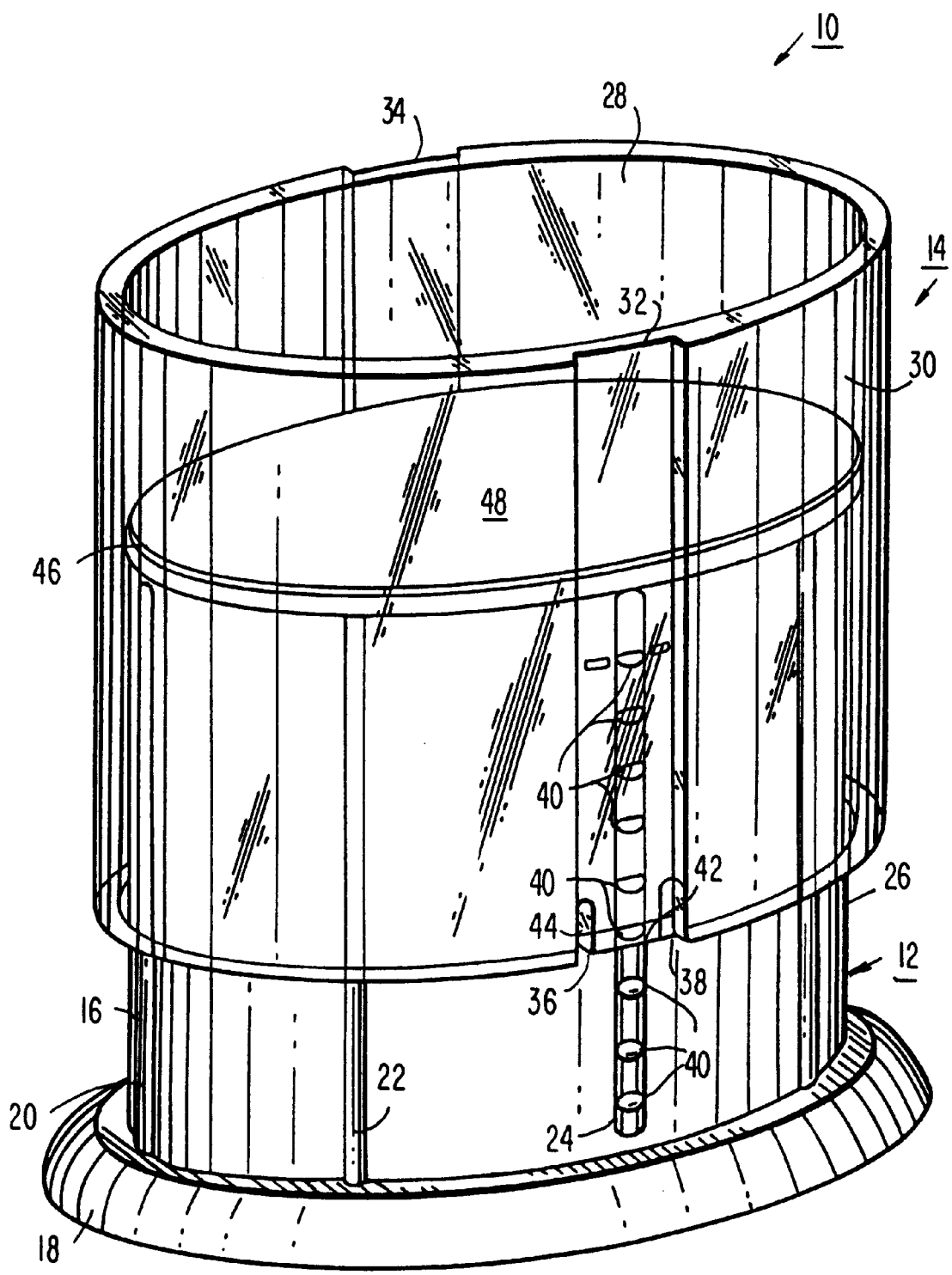
FIG. 1 is a perspective view of one embodiment of the measurement device of the present invention, with the sleeve raised to a mid-level for use in measuring.

The measurement device 10 shown in FIG. 1 includes a base member, generally indicated at 12, and a sleeve generally indicated at 14. The sleeve 14 slides upwardly and downwardly on the base member 12.

The base member 12 includes an oblate hollow cylindrical post member 16, and a base flange 18 which extends outwardly to form a support for the device to rest on a horizontal surface. The uppermost end 48 of the post 16 is closed and has a flat planar elliptical shape.

Extending outwardly from the surface of the post 16 are several vertically-extending ribs 20, 22, 24 and 26. Since a rear view of the device shown in FIG. 1 would be identical to the front view (that is, since the device 10 is symmetrical about its vertical axis), there are four additional ribs like ribs 20, 22, 24, and 26 located diametrically opposite the ribs shown in FIG. 1. That is, the rib 20 is on the horizontal center line M (see FIG. 3) of the ellipse forming the cross-sectional shape of the base member and the sleeve, and the rib 20 has a counterpart located on the opposite side of the post 16, also on the horizontal center line M.

Similarly, the rib 24 is on the vertical center line N (see FIG. 3) of the ellipse, and there is an identical rib 24, on the opposite side of the post, which also is aligned with the vertical center line N of the ellipse.

Similarly, there are ribs corresponding to ribs 22 and 26 diametrically opposite those ribs on the other side of the post 16.

The sleeve 14 preferably is made of transparent plastic and has an internal surface 28 and an external surface 30. The sleeve 14 also has two relatively wide vertical grooves 32 and 34 located on the vertical center line N of the ellipse shown in FIG. 3 which effectively reduce the thickness of the material of the sleeve in those locations, both for the purpose of helping to form the detent structure to be described below, and to provide a better gripping surface for gripping the sleeve with the hand.

At the lower end of each groove 32 and 34 are two slots 36 and 38 in the lower edge of the sleeve. These slots form a section 42 (also see FIG. 6) which is separated from the remainder of the sleeve to form a flexible projection for use in the detent structure of the invention.

The detent structure is completed by providing spaced indentations 40 in the vertical rib 24, and a projection 44 extending inwardly towards the center of the sleeve from adjacent the bottom edge of the projection 42 and dimensioned to fit into the notches 40.

As the sleeve is moved upwardly and downwardly on the post 16, the projection 44 first is urged into one of the notches 40, then is biased outwardly and rides on the edge of the rib 24 between notches, flexing outwardly, and then snaps into the next notch, thus allowing the user of the measuring device to feel the snap and determine that the location of the sleeve relative to the base member is correct for an accurate measurement.

Secured around the perimeter of the upper surface 48 is a flexible sealing member 46 which is dimensioned so as to make intimate contact with the internal surface 28 of the sleeve and form a liquid-tight seal between the internal surface 28 and the upper surface 48 of the post member 16.

FIG. 4 shows how the perimeter area 49 of the post member 16 is molded to form a shelf onto which the sealing member 46 is secured. The outer edge of the member 46 is beveled as it is shown in FIG. 4 to produce a relatively sharp sealing edge.

An alternative sealing construction is shown in FIG. 5 where a thicker seal member 50 is secured into a larger indentation 51 in the upper periphery of the post member 16. The sealing member 50 has two sharp edges 52 and 54 vertically spaced from one another so as to provide sealing contact at two different vertically-spaced locations with the internal surface 28 of the sleeve. This has the advantage of providing a more secure seal. This also helps to minimize wobble of the sleeve relative to the post member 16 due to the fact that there is a relatively wide space between the outer surface of the post member 16 and the inner surface 28 of the sleeve. This space is relatively wide in order to prevent unwanted contact and friction between the post 16 and the sleeve 14.

The eight vertical ribs 20, 22, 24 and 26, etc., also help prevent wobble. The sleeve makes contact with the ribs at eight locations around the periphery of the device so that the friction between the sleeve and the post member 16 is minimized, while also minimizing wobble and leakage which might be caused by the wobble.

The parts of the device 10 preferably are formed by injection molding and preferably are made out of a tough breakage-resistant thermoplastic material such as polycarbonate.

The material of the sealing member 46 preferably is an elastomeric compound, such as that sold under the trademark Sanoprene.

Figure 2:
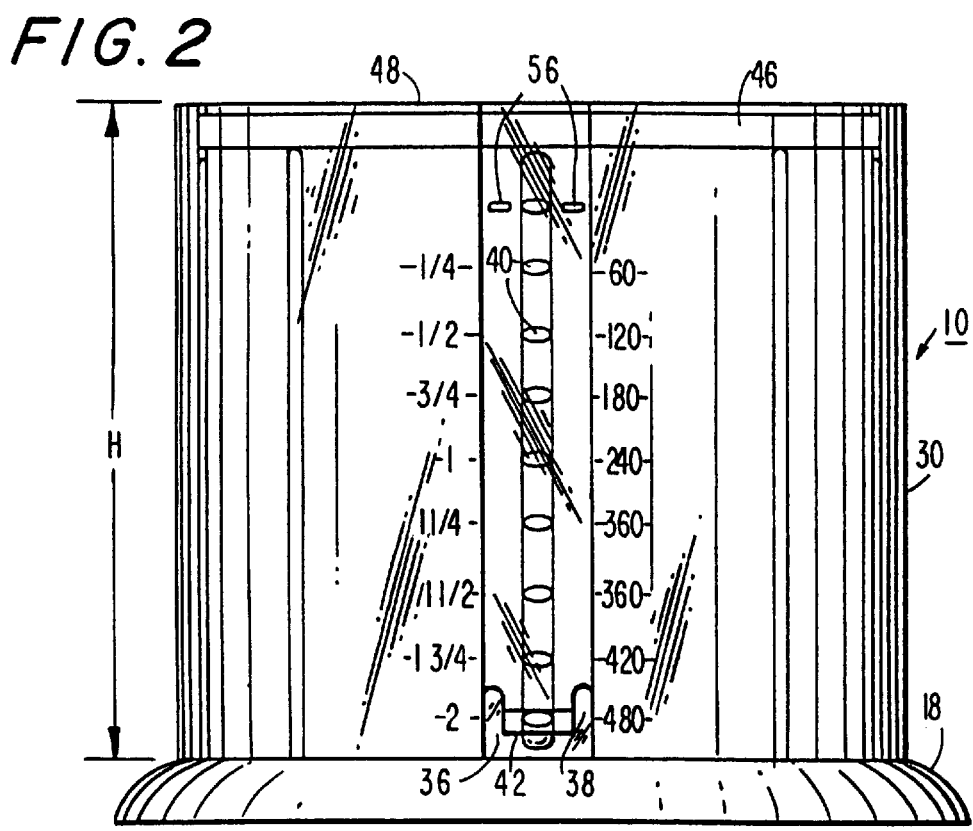
FIG. 2 is a front elevation view of the device shown in FIG. 1, with the measurement sleeve in its lower-most position.

FIG. 2 shows various volume markings on the sleeve, and reference markings 56 on the post member 16. The sleeve markings are in cups on the left and in milliliters on the right.

When the sleeve has been moved upwardly to a position in which one of the volume markings is opposite the reference markings 56, the space defined by the upper surface 48 of the post member 16 and the inner surface 28 of the sleeve will have the measurement capacity indicated. The detent structure helps to insure that the slider will be accurately located for each of the measurements.

Figure 3:
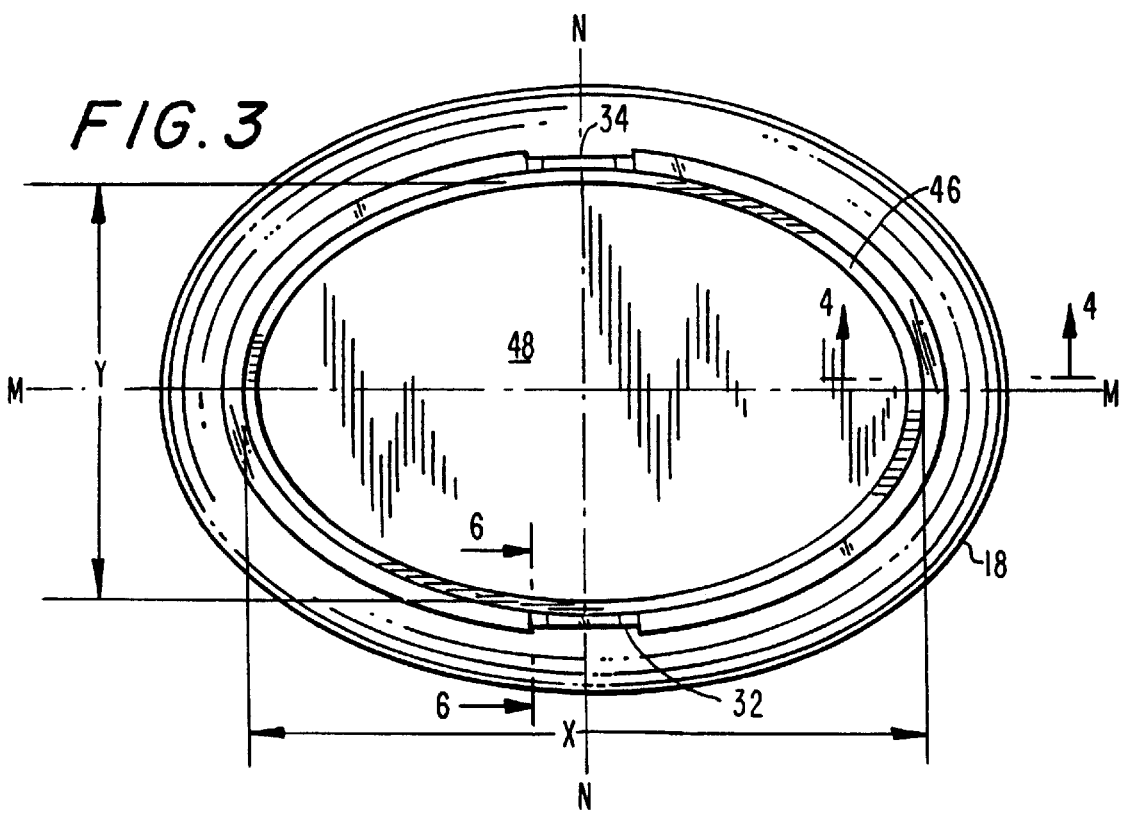
FIG. 3 is a top plan view of the device shown in FIGS. 1 and 2.

In a preferred embodiment of the invention, the device has the following dimensions. The height H shown in FIG. 2 is 2 and ⅞ inches. Referring to FIG. 3, the inside dimension of the sleeve Y along the vertical minor axis N of the ellipse defining the sleeve 14 was approximately 2 and ⅜ inches, while the dimension X along the horizontal axis M was approximately 3-¼ inches.

The ratio of the dimension X to the dimension Y of the ellipse defining the shape of the sleeve and seal was approximately 1.36. A preferred range of values for this ratio is between approximately 1.2 and 1.5.

The outer dimensions of the sealing member 46 are just slightly larger than the inner dimensions of the sleeve so that a tight fit is formed between the sealing member and the sleeve so as to provide a good, water tight seal for holding liquids in the measurement device. Referring to FIG. 4, the width D of the sealing element 46 was approximately 3/16 of an inch. The thickness of the sealing element 46 was approximately the same.

FIGS. 7–10 shown another embodiment of the invention in which the construction is simplified for easier molding, an improved seal is provided, and a lip on the upper edge at both narrow ends of the sleeve minimizes dripping and running of a liquid which has been poured.

The device shown in FIGS. 7 through 10 is essentially the same as that shown in FIGS. 1 through 6, except that the detent structure of the earlier embodiment has been eliminated, and other improvements have been provided as set forth below.

Figure 8:
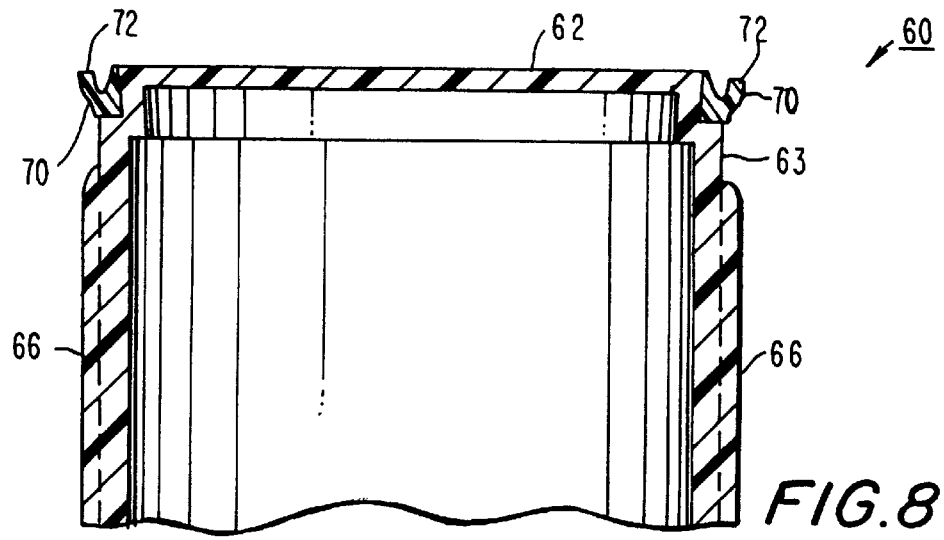
FIG. 8 is a broken-away cross-sectional view taken along line 8—8 of FIG. 7.
Figure 10:
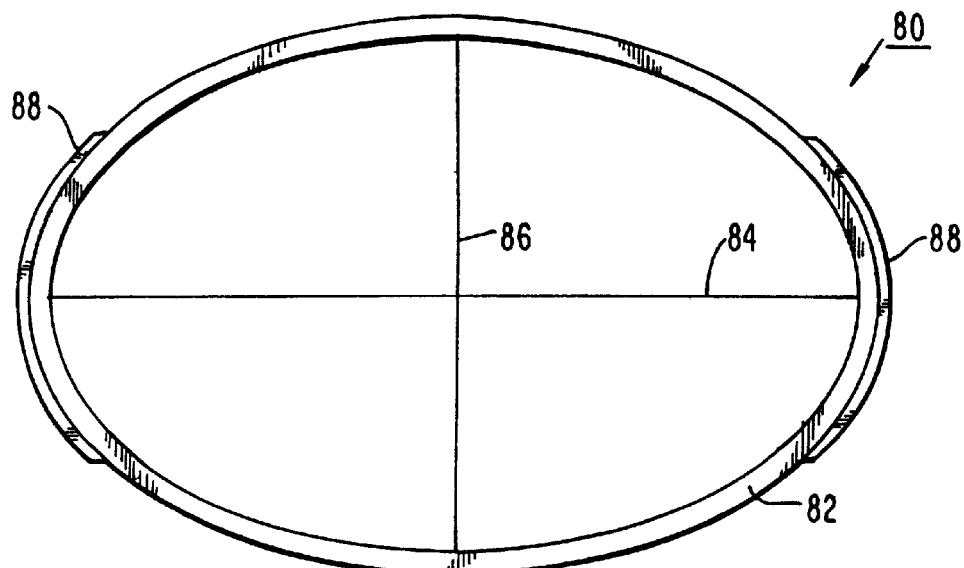
FIG. 10 is a top plan view of the sleeve shown in FIG. 9.
Figure 9:
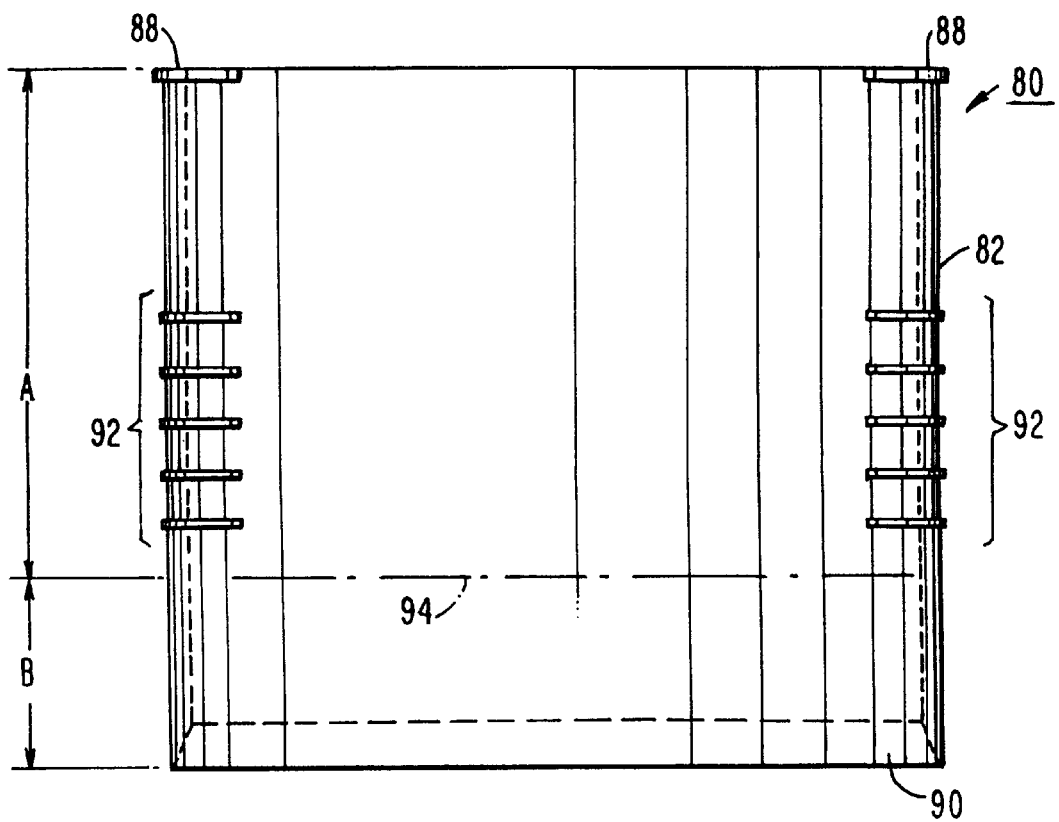
FIG. 9 is a side elevation view of the sliding sleeve which is to be combined with the base shown in FIGS. 7 and 8 to form a complete measuring device.

The measuring device here under discussion comprises a base 60 (FIGS. 7 and 8), and a sleeve 80 (FIGS. 9 and 10).

Figure 7:
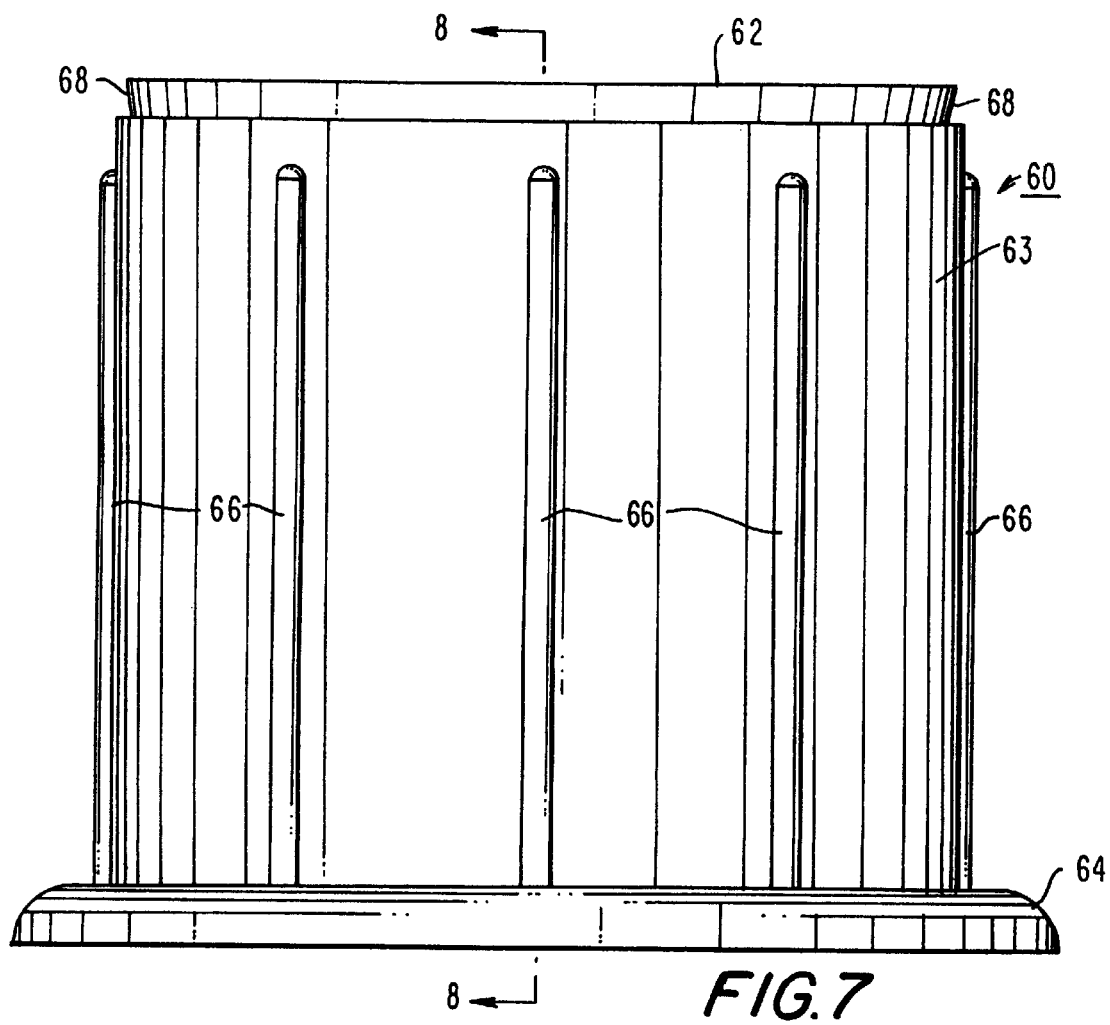
FIG. 7 is a side elevation view of the base member of another embodiment of the measuring device of the present invention.

Referring to FIG. 7, the base 60 is a hollow molded structure like that shown in FIGS. 1 through 6, except there is no detent structure, and the uniform ribs 66 are provided as shown.

The base 60 includes a top end wall 62, a curved support flange 64, vertical side wall 63 and vertical ribs 66.

Around the edge of the top of the base is a recess 68 to receive a seal, which is not shown in FIG. 7 but is illustrated at 70 in FIG. 8. As it is shown most clearly in FIGS. 11 and 12, the vertical wall of the recess 68 is sloped slightly so that the base 67 of the vertical wall is inset farther towards the center of the device than the top 69 of that wall. This helps to hold the seal securely in place.

Figure 11:
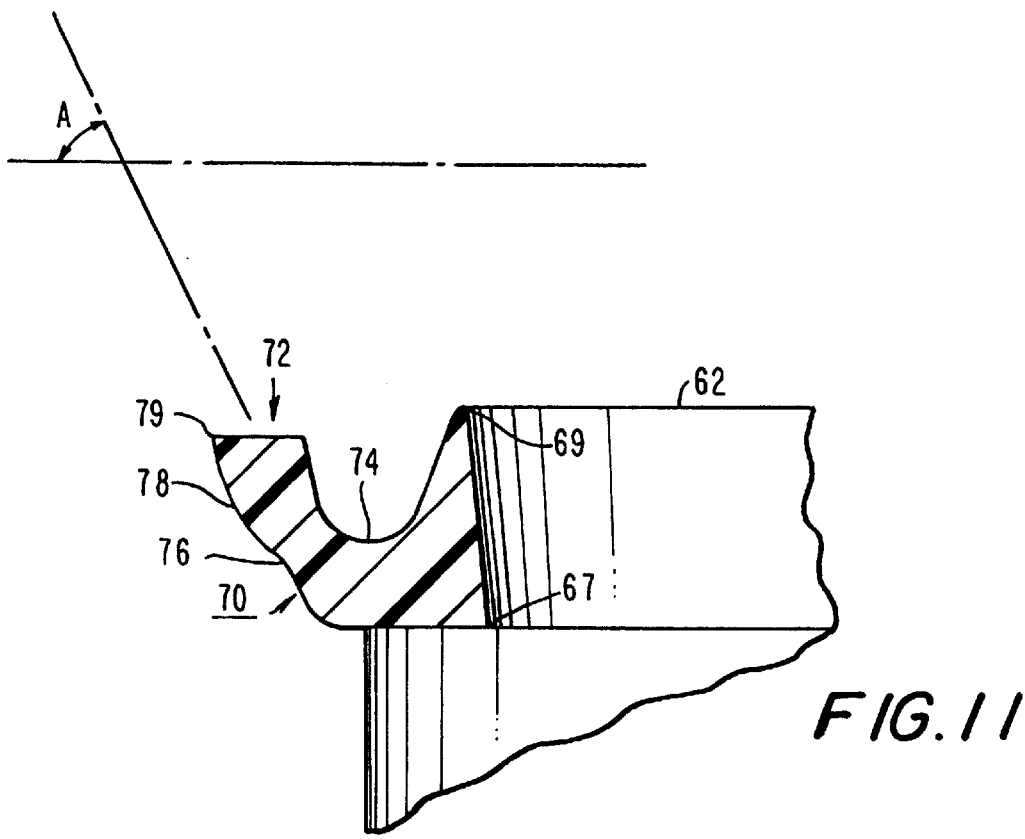
FIG. 11 is a enlarged cross-sectional, partially broken-away view of the seal shown in FIGS. 7–10, with the seal relaxed.
Figure 12:
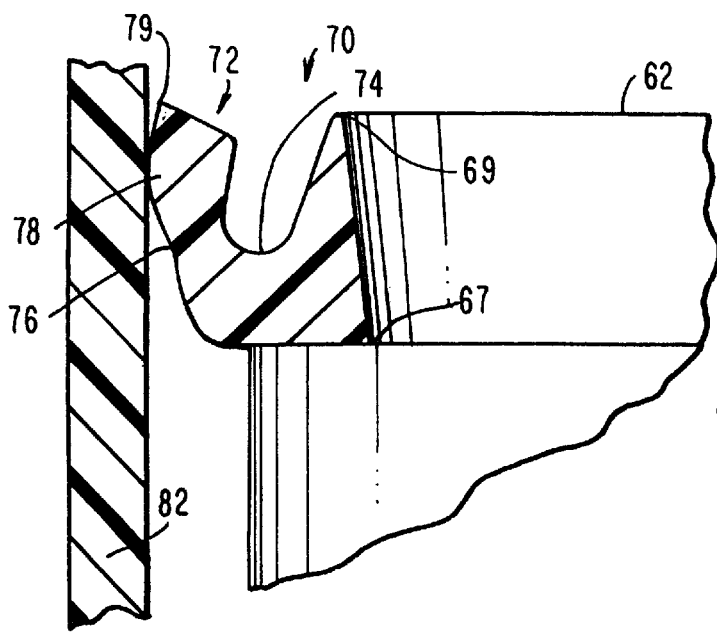
FIG. 12 is a view showing the seal of FIG. 11 in contact with and compressed against the side-wall of the sleeve of FIG. 9.

Referring to FIG. 8, which is a cross-sectional view taken along line 8—8 of FIG. 7, and to FIGS. 11 and 12, the seal 70 is molded into the recess 68. The seal includes an elongated, relatively thin flange or wiper element 72 which extends outwardly and upwardly from the base member.

Referring now to FIGS. 11 and 12, the seal 70 has a deep groove 74 which forms the flange 72. The flange is relatively thin at 76 to improve its flexibility, has a relatively slight curvature at a contact surface 78, and has a sharp tip 79 caused by the mold parting line.

The flange 72 is dimensioned so as to stay below or even with the top 62 of the base. This facilitates measuring thick materials such as peanut butter, lard, etc. Such materials can be pushed out of the sleeve, after measurement, by pushing the base into the sleeve. Then, any materials adhering to the top wall 62 of the base can scraped off with a knife without cutting or damaging the seal 70 because it is recessed.

The flange or wiper 72 is given a relatively slight curvature at the contact surface 78 so as to maximize the sealing contact area of the seal.

As it is shown in FIG. 12, the dimensions of the seal are such that the flange 72 is bent substantially by contact with the inner side of the sleeve wall 82, thus forming a tight seal, as well as bending the sharp edge 79 away from that wall. By preventing contact between that sharp edge and the sleeve wall, the possibility that the flange 72 will "roll up" when the sleeve 80 moved downwardly on the base is minimized.

The seal 70 preferably is made of a thermoplastic elastomer such as that sold under the trademark "C-Flex" by Consolidated Polymer Technologies, Inc. of Largo, Fla., U.S.A. The seal preferably is molded in place.

The seal material preferably contains a substantial proportion of polypropylene, as well as a small quantity of wax for lubricity. For example, the seal material can contain more than 50% polypropylene and around 2% wax. The wax, as well as the fairly steep upward angle "A" (e.g. 50° to 70° when relaxed) at which the flange 72 extends, help to prevent the "roll up" problem discussed above.

The base member 60 preferably is molded of polypropylene. The molding of the seal in place is believed to form covalent bonds between the seal material and the material of the base member. Therefore, the seal is very securely attached to the base member.

The seal construction shown is highly advantageous. Because the walls of the slider are somewhat flexible, and for other reasons, the spacing between the sleeve and the base member often changes substantially while the device is in use. The relatively thin, flexible wiper element of the seal accommodates such variations and tends to maintain a seal throughout many distortions of the measuring device structure. Moreover, the relatively thin, flexible nature of the seal allows the sleeve to slide on the base member relatively freely and easily, while still being firm enough to hold the sleeve securely in a position to which it is set without the need for of a detent mechanism.

Referring now to FIGS. 9 and 10, the sleeve 80 is like the sleeve of the device shown in FIGS. 1 through 6, except for several new features described below.

As it is shown in FIG. 10, the sleeve 80 includes a wall 82, formed into the shape of an ellipse having a minor axis 86 and a major axis 84.

At the upper edge of the sleeve, at the narrow ends of the sleeve, two short lips 88 extend outwardly from the top edge of the sleeve. These lips tend to prevent dripping and running of liquids down the side of the sleeve after the liquid has been poured from the container. The lips 88 extend around the periphery of the sleeve 80 by approximately the distance covered by most streams of liquid being poured.

Also included are two series of raised ridges 92 at the narrow ends of the sleeve. These are provided in order to promote easier and more secure gripping of the sleeve to pull or push it into a new position.

The sleeve 80 has a beveled lower edge 90. This bevel is provided in order to facilitate the insertion of the base member into the bottom of the sleeve.

In accordance with another aspect of the invention, referring to FIG. 9, the distance between the bottom edge of the sleeve and the top of the base member, whose position is shown at 94, when the sleeve is extended the most to its maximum capacity location, is somewhat greater than in the embodiment shown in FIGS. 1 through 6. The ratio of A to B is the ratio of the distance from the top of the sleeve to the top of the base to the distance from the top of the base to the bottom of the sleeve. The ratio of A to B in the FIG. 9 embodiment is relatively smaller than it is in the embodiment in FIGS. 1–6. This gives contact over more surface area below the top of the base member for the same volume measurement, thus maximizing the surface area of the sleeve which contacts the vertical ribs so as to stabilize the sleeve and minimize tipping and leakage of liquids from the container.

Preferably, the ratio of the distance A to distance B is within the range of from 3 to 1 to 5 to 1.

The measurement devices described above have the advantages outlined briefly above. Specifically, the devices have a relatively large ratio of volume to height, thus making them shorter, for a given volume of measurement, than prior devices of the same type, while not being so large in width that it is difficult for the average adult hand to grasp. The shorter height makes the device less subject to tipping and spillage, and makes the device more compact so as to occupy less storage space.

The oblate oval shape of the device provides a built-in pour-spout which reduces the width of the stream of liquid being poured from the container, thus further reducing the likelihood of spills.

The highly effective wiper type of seal minimizes leakage, and the lips at the narrow ends of the sleeve minimize dripping and running.

The simplification of the structure in the FIGS. 7–10 embodiment by eliminating the detent structure reduces the complexity and cost of the injection molds used to make the device.

The above description of the invention is intended to be illustrative and not limiting. Various changes or modifications in the embodiments described may occur to those skilled in the art. These can be made without departing from the spirit or scope of the invention.

What is claimed is:

1. An adjustable measuring device comprising, in combination, a base member having two ends with a wall adjacent one of said ends, said wall having an oblate flexible sealing element extending around its perimeter, and an oblate cylindrical sleeve, said sleeve having an external surface and an internal surface, said internal surface having a cross-sectional shape matching that of said sealing element, said internal surface having dimensions larger than the dimensions of said base member but smaller than those of said sealing element so that said sleeve can slide longitudinally over said base member in contact with said sealing element, and said internal surface of said sleeve and said wall of said base member together form a container of adjustable capacity, said measuring device having indicia thereon to indicate the capacity of said container at each of a plurality of different longitudinal positions of said sleeve relative to said wall for measuring variable quantities of material in said container, said sealing element having a thin, extending outwardly and upwardly therefrom flexible wiper element to wipe against said internal surface of said sleeve.

2. A device an in claim 1, in which said sealing element and said cross-sectional shape of said internal surface of said sleeve are ellipses.

3. A device an in claim 2, in which the ratio of the major axial dimension to the minor axial dimension of each of said ellipses is approximately 1.2 to 1.5.

4. A device an in claim 1, in which said base member has an oblate cylindrical shape, and said wall comprises a closed end to said base member.

5. A device an in claim 4, in which the dimensions of said internal surface are substantially larger than the external dimensions of said base member, and including a plurality of longitudinally-extending ribs protruding from the external surface of said base member to contact and guide said internal surface of said sleeve.

6. A device an in claim 1, including a detent structure on said sleeve and said base member to mark different volume measurements for said container.

7. A device as in claim 1, in which the curvature of said sleeve is great at two opposed sides, and including a short lip extending outwardly from the upper edge of said sleeve in the vicinity of at least one of said two opposed sides.

8. A device as in claim 1, in which said wall of said base member has a recess extending around its edge, with said sealing element seated in said recess, said sealing element extending upwardly to a point no higher than the upper surface of said wall.

9. A device as in claim 8, in which said sealing element is made of an elastomer with a constituent of a material of which said base member is made, and in which said sealing element is chemically bonded to said base member.

10. A device as in claim 8, in which said sealing element extends upwardly at an angle and contains an elastomer with wax for lubricity.

11. A device as in claim 1, in which said sleeve has upper and lower edges, and in which said lower edge of said internal surface is beveled to facilitate fitting of said sleeve onto said base member over the protruding edge of said sealing element.

* * * * *